US010402477B2

(12) United States Patent
Costa et al.

(10) Patent No.: US 10,402,477 B2
(45) Date of Patent: Sep. 3, 2019

(54) METHOD FOR REAL-TIME AUTOMATIC MODIFICATION ON THE SERVER SIDE OF A WEB PAGE TO VISUALIZE A CONTENT SUPERPOSED TO THE WEB PAGE

(71) Applicants: Vittorio Costa, Rome (IT); Vincenzo Capuano, Monte Porzio Catone (IT); Emiliano Pierdominici, Rome (IT)

(72) Inventors: Vittorio Costa, Rome (IT); Vincenzo Capuano, Monte Porzio Catone (IT)

(73) Assignees: Vittorio Costa, Rome (IT); Vincenzo Capuano, Monte Porzio Catone (IT); Emiliano Pierdominici, Rome (IT)

( * ) Notice: Subject to any disclaimer, the term of this patent is extended or adjusted under 35 U.S.C. 154(b) by 658 days.

(21) Appl. No.: 14/490,807

(22) Filed: Sep. 19, 2014

(65) Prior Publication Data
US 2016/0041955 A1 Feb. 11, 2016

(30) Foreign Application Priority Data
Aug. 5, 2014 (IT) .............................. RM2014A0458

(51) Int. Cl.
G06F 17/22 (2006.01)
G06Q 30/02 (2012.01)
H04L 29/08 (2006.01)
G06F 16/957 (2019.01)

(52) U.S. Cl.
CPC ...... G06F 17/2247 (2013.01); G06F 16/9577 (2019.01); G06Q 30/0277 (2013.01); H04L 67/02 (2013.01)

(58) Field of Classification Search
CPC . G06Q 30/02; G06Q 30/0277; G06C 30/0277
USPC ........................................................ 715/234
See application file for complete search history.

(56) References Cited

U.S. PATENT DOCUMENTS

| 2007/0180147 | A1* | 8/2007 | Leigh ..................... G06Q 30/02 709/246 |
| 2007/0256003 | A1 | 11/2007 | Wagoner et al. |
| 2008/0140728 | A1 | 6/2008 | Fraser et al. |
| 2009/0125544 | A1* | 5/2009 | Brindley ........... G06F 17/30038 |

OTHER PUBLICATIONS

Rachel Ober, "Maximum Z-Index Values", Aug. 29, 2011, <https://rachelober.com/tech/maximum-z-index-values/>.*
HTML Code Tutorial, "<Body . . . >", Published prior to: Mar. 5, 2012, <http://www.htmlcodetutorial.com/document/_BODY.html>.*
"HTML <body> tag", W3Schools, Published prior to Mar. 24, 2011, <http://www.w3schools.com/tags/tag_body.asp>.*
"Robust Multilingual Parsing Using Island Grammars"; Synytskyy et al; Published Oct. 6, 2003.*
"Detailed Look at Stacking in CSS"; Tim Kadlec; <https://timkadlec.com/2008/01/detailed-look-at-stacking-in-css/>; Published Jan. 30, 2008.*

(Continued)

Primary Examiner — Stephen S Hong
Assistant Examiner — Broderick C Anderson
(74) Attorney, Agent, or Firm — Volpe and Koenig, P.C.

(57) ABSTRACT

A method to insert in any Web page visited by a user, the HTML and JavaScript code allowing the insertion of an icon over the browser and the corresponding code to allow its opening to show corresponding information or an advertising panel.

4 Claims, 5 Drawing Sheets

(56) References Cited

OTHER PUBLICATIONS

"z-index"; <http://css-tricks.com:80/almanac/properties/z/z-index/>; Published prior to Jul. 24, 2014.*
Co-pending Italian Patent Application No. RM2014A000141, filed Mar. 29, 2014, entitled "Method for Real-Time Automatic Modification on the Server Side of a Web Page to Visualize a content Superposed to the Web Page" by Capuano et al.
Justin C. Watt: "Hotel Will JavaScript Injection", Justinsomnia.org, Apr. 3, 2012 (Apr. 3, 2012), pp. 1-5, XP055178407, Retrieved from the Internet: URL: http://justinsomnia.org/2012/04/hotel-wifi-javascript-injection/ [retrieved on Mar. 23, 2015]. p. 1, col. 1.
Louis Lazaris: "The Z-Index CSS Property: A Comprehensive Look", Smashing Magazine, Sep. 15, 2009 (Sep. 15, 200), pp. 1-16, XP055178253, Retrieved from the Internet: URL: http://www.smashingmagazine.com/2009/09/15/the-z-index-css-property-a-comprehensive-look/ [retrieved on Mar. 20, 2015].

* cited by examiner

METHOD FOR REAL-TIME AUTOMATIC MODIFICATION ON THE SERVER SIDE OF A WEB PAGE TO VISUALIZE A CONTENT SUPERPOSED TO THE WEB PAGE

CROSS REFERENCE TO RELATED APPLICATION

This application claims priority to Italian Patent Application No. RM2014A000458, filed Aug. 5, 2014, the entire contents of which are hereby incorporated by reference as if fully set forth herein.

TECHNICAL FIELD

The present invention relates to a method for the real-time automatic modification on the server side of a Web page to visualize a content superposed to the Web page.

More in detail, the present invention concerns a method that is able to insert into any Web page visited by the user by mobile phone, tablet, or PC, the HyperText Markup Language (HTML) and JavaScript code allowing the insertion of an icon over a browser and the corresponding code allowing the opening thereof, and showing the corresponding information or advertisement banner.

BACKGROUND

No products are known to the inventors which are able to modify Web pages on-the-fly to obtain the visualization of a content superposed onto a Web page.

The main problem is the possibility of inserting into any Web page visited by the user by mobile phone, tablet, or PC, the HTML, and JavaScript code allowing the insertion of an icon (possibly rotatable) over a browser and the corresponding code allowing the opening thereof, and showing the corresponding information or advertisement banner.

The difficulty is represented in automatically finding and in real time the most appropriate lines of code of any Web page wherein one can insert, in a transparent way and in real time, the lines of code without interfering with the normal functioning of the Web page.

If the new code was not inserted in the right place, the original Web page could be not visualized correctly any longer or not even visualized at all.

Another technical problem consists in visualizing both the icon and the banner over all the elements constituting the Web page and therefore superposing onto the page and appearing in the foreground.

U.S. Patent Application Publication No. 2007/0180147A1 describes a method for the modification of a Web page in real time. This document teaches adding an advertising banner over the heading of a Web page, thus modifying the layout of the original page by dividing it into two separate frames, wherein an advertising banner is inserted (on the top) in the first frame and the original page is inserted in the second frame. Therefore, it deals with an invasive content with respect to the Web page, because it modifies its original layout.

SUMMARY

It is an object of the present invention to provide a method solving at least partially the problems of the prior art.

The present invention describes a method for the real time automatic modification on the server side of a Web page to visualize a content superposed to the Web page on a screen of a computer electronic device, in particular a mobile computer device, characterized in that the following steps are executed:

A. intercepting a Web page requested by the computer electronic device;

B. searching for the string "<head>" or "</head>" in the code of the Web page of step A, and B1. if the string is present, inserting a header code relevant to the superposed content and setting the HTML "z-index" parameter, as defined by the World Wide Web Consortium (W3C), to its maximum value;

B2. if the string is not present, creating the section "<head>" or "</head>" in the code of the Web page of step A and executing step B1;

C. searching for the string "<body>" or "</body>" in the code of the Web page of step A or B, and C1. if both the "<body>" and "</body>" strings are present, inserting a body code relevant to the superposed content immediately before the "</body>" string;

C2. if the second string is not present, creating a body section starting with the "<body>" string and ending with the "</body>" string in the code of the Web page and executing step C1;

D. sending to the computer electronic device the Web page with the modification of steps B and C;

wherein if steps B2 or C2 cannot be executed, the Web page of step A is not modified.

According to an aspect of the invention, step B includes the preliminary sub-step:

B0. Hiding all the commented code lines in the code of the Web page, to find a true section "<head>" or "</head>".

According to an aspect of the invention, step C includes the preliminary sub-step:

C0. Hiding all the commented code lines in the code of the Web page, to find a true string "<body>" or "</body>".

According to an aspect of the invention, between step A and B, the following steps are executed:

D. obtaining the User Agent information of the computer electronic device;

E. utilizing the User Agent information to distinguish the data traffic relevant to a browser and the data traffic relevant to an application, and discarding application data and choosing the correct headers.

It is subject matter of the present invention a computer program, characterized in that it comprises code means that, when they are executed by a server, realize the method according to the invention.

It is subject matter of the present invention a non-transitory memory medium readable by a computer, having a computer program stored on it, characterized in that the computer program is the computer program according to the invention.

It is subject matter of the present invention a server, comprising code means configured to execute the method according to the invention.

BRIEF DESCRIPTION OF THE DRAWINGS

The invention will be now described by way of illustration but not by way of limitation, with particular reference to the drawings of the annexed Figures, wherein.

DETAILED DESCRIPTION

According to the invention, a server intercepts a Web page requested by a user, executes in real time the modifications to the page, which are needed to insert the HTML and JavaScript code according to the invention, and sends the modified page to the user.

The insertion of the code according to the invention in the Web page occurs in an automatic way and follows an intelligent algorithm that identifies the correct sections, which vary from one HTML type to another, wherein the code relevant to the content to superpose is inserted, without modifying the original contents of the processed page.

Figure 1:
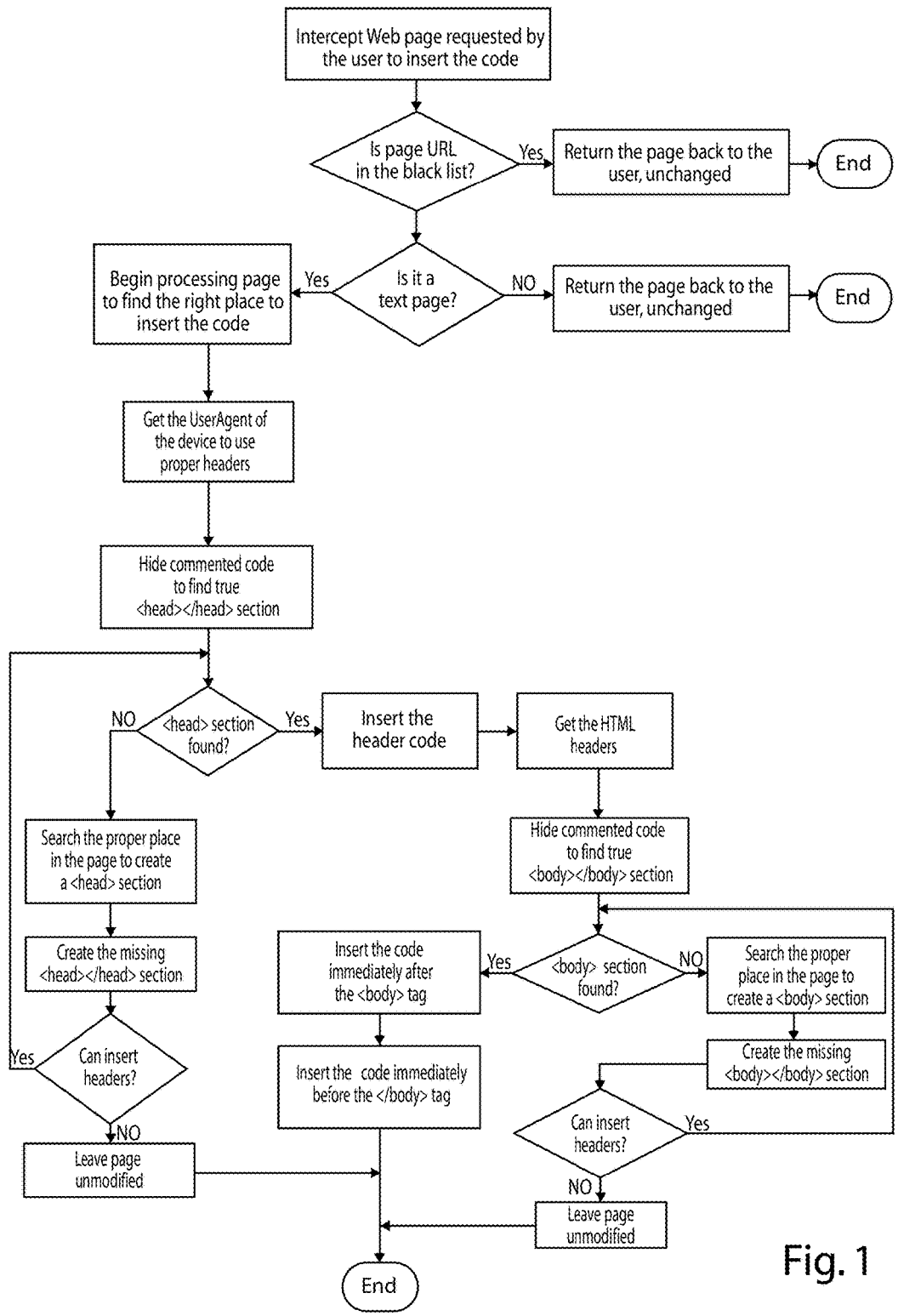
FIG. 1 shows a flowchart illustrating an embodiment of the present invention.

Making reference to FIG. 1, the method verifies that the page is not in a black list, and the method proceeds to verify that it does deal with a text page.

Afterwards, the first section that the algorithm seeks is the headers page section identified by the HTML tag "<head>". At this point, once determined and personalized depending on the User Agent information of the device so as to modify only requests made by a Web browser and not by programs and/or applications, a code with a meta tag HTML is inserted, which defines the zoom ratio by which the page is to be visualized initially. The following HTML code for the default case is an example: <meta name="viewport" content="width=device-width,initial-scale=0.84,minimum-scale=0.1,maximum-scale=10.0,user-scalable=yes"/>.

The User Agent information is used to identify the device and, if needed for that particular device, insert particular parameters of the <meta> tag into the <head> section for the correct visualization of the content. The User Agent information is also used to distinguish the traffic of the browser from the traffic of the applications, and not to modify the data traffic of an application.

Thereafter, the HTML tag "<body>" is identified and immediately after the tag, inserts the code (HTML, Cascading Style Sheet (CSS), and JavaScript) that defines the geometry of the banner according to the invention, the semi-transparent superposed icon, and the modes of opening and visualizing the panel when the superposed icon is clicked on. The utilized algorithm also solves the problem of visualizing both the superposed icon and the banner in the foreground with respect to the Web page and therefore leaving the content underneath by using the HTML "z-index" parameter and assigning high values to it. In an embodiment, in the case of the superposed icon, this is realized in semi-transparent mode to not disturb the visualization of the background page, while the banner is opaque with respect to the background page because it is activated upon user need.

At the end of the page, the "</body>" tag is identified, and immediately before the tag, the JavaScript activation code of the content is inserted.

After having inserted the code into the Web page, the Web page is sent to the user in a transparent way and with a delay that is practically null with respect to the original page.

The algorithm of inserting the code according to the invention into any page must take into account, in real time, of the many different methods of writing the pages and adapting automatically to any page type.

In the following these algorithms are explained in more detail, with reference to FIG. 1.

There are Web pages that do not have <body> or </body> tags, nor <head> or </head> tags, either by choice of architecture or, more commonly, by error. The method according to the invention needs to use these tags to correctly insert its code in the context of the Web page. Moreover, there are cases wherein in the same page more than one <body> or <head> tag is present and the algorithm must understand which is the right one. There are also cases wherein some tags (<body> or <head>) are part of a comment, and the method must identify the correct tags and not select the tags that are part of a comment.

The method utilizes adaptive steps to handle these situations, creating the right prerequisite to insert in the correct place in the page. The method, in some cases, automatically corrects the errors in the syntax of the pages. In other cases, the method adds some lines of code in the page to be able to insert itself transparently and without modifying the layout of the original page.

In the case where some fundamental tags for the correct use of the invention are lacking, as for example the <head> or <body> and </body> tags, the invention automatically seeks the best position to insert them. If the correct position could not be found or there is a risk that the normal functioning of the page is jeopardized, then the page is not modified. There are various cases:

(1) Lack of <head> and </head> tags. Depending on the page structure, these tags are inserted before the <body> tag if it exists, otherwise just after the <html> tag.

(2) Lack of <head> tag but presence of </head> tag. Depending on the page structure, the <head> tag is inserted immediately before the </head> tag or just after the <html> tag.

(3) Lack of <body> tag. It is inserted immediately after the </head> tag.

(4) Lack of </body> tag. It is inserted immediately before the </html> tag.

(5) Lack of <body> and </body> tags. They are inserted immediately after the </head> tag.

(6) It is impossible to find a point for the insertion of the <head>, <body>, or </body> tags. There are rare cases wherein because of the lack of these tags, it is preferable not to modify the page. In these cases, the Web page is sent to the user without modifying it.

Figure 2:
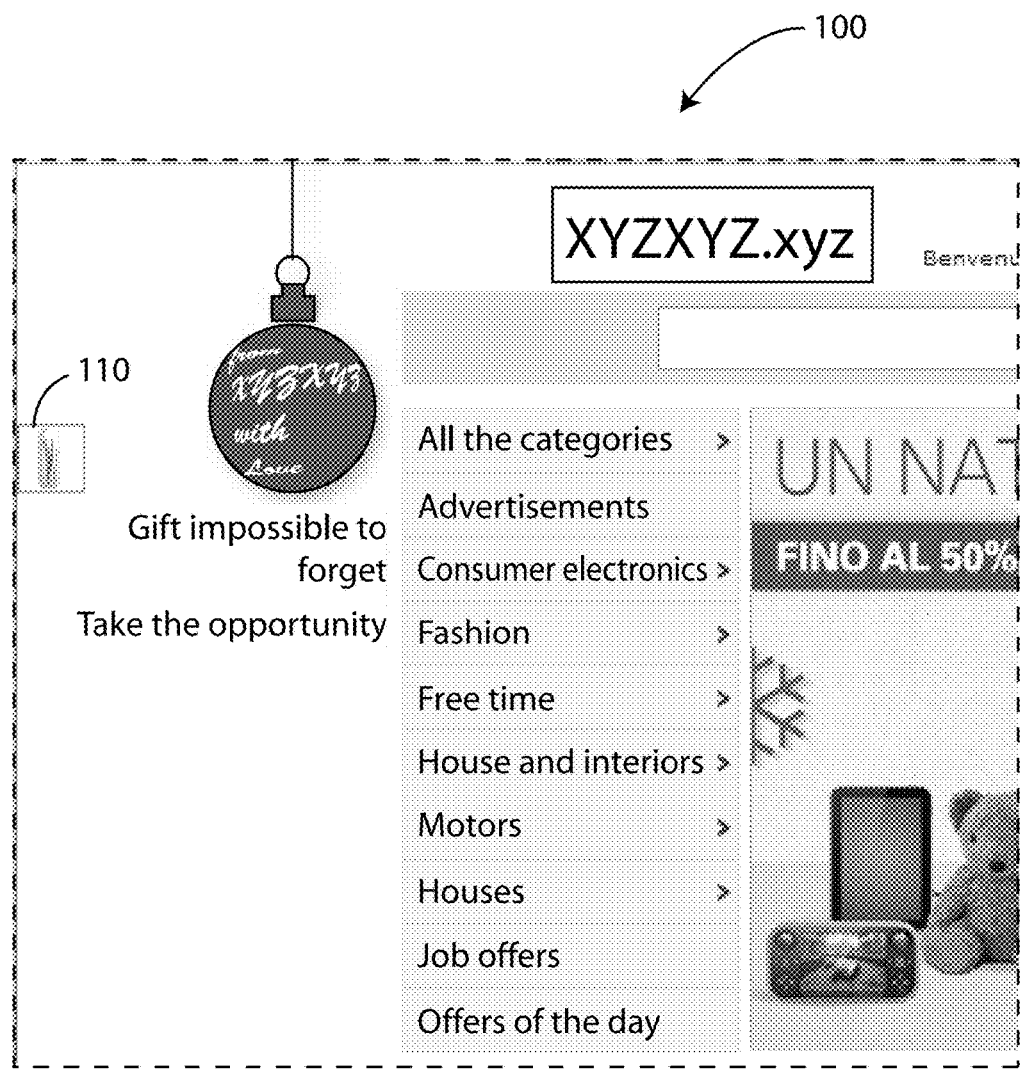
FIG. 2 shows an example of content (an icon) superposed according to the invention.
Figure 3:
FIG. 3 shows an example of content obtained by clicking on the icon of FIG. 2.
Figure 4:
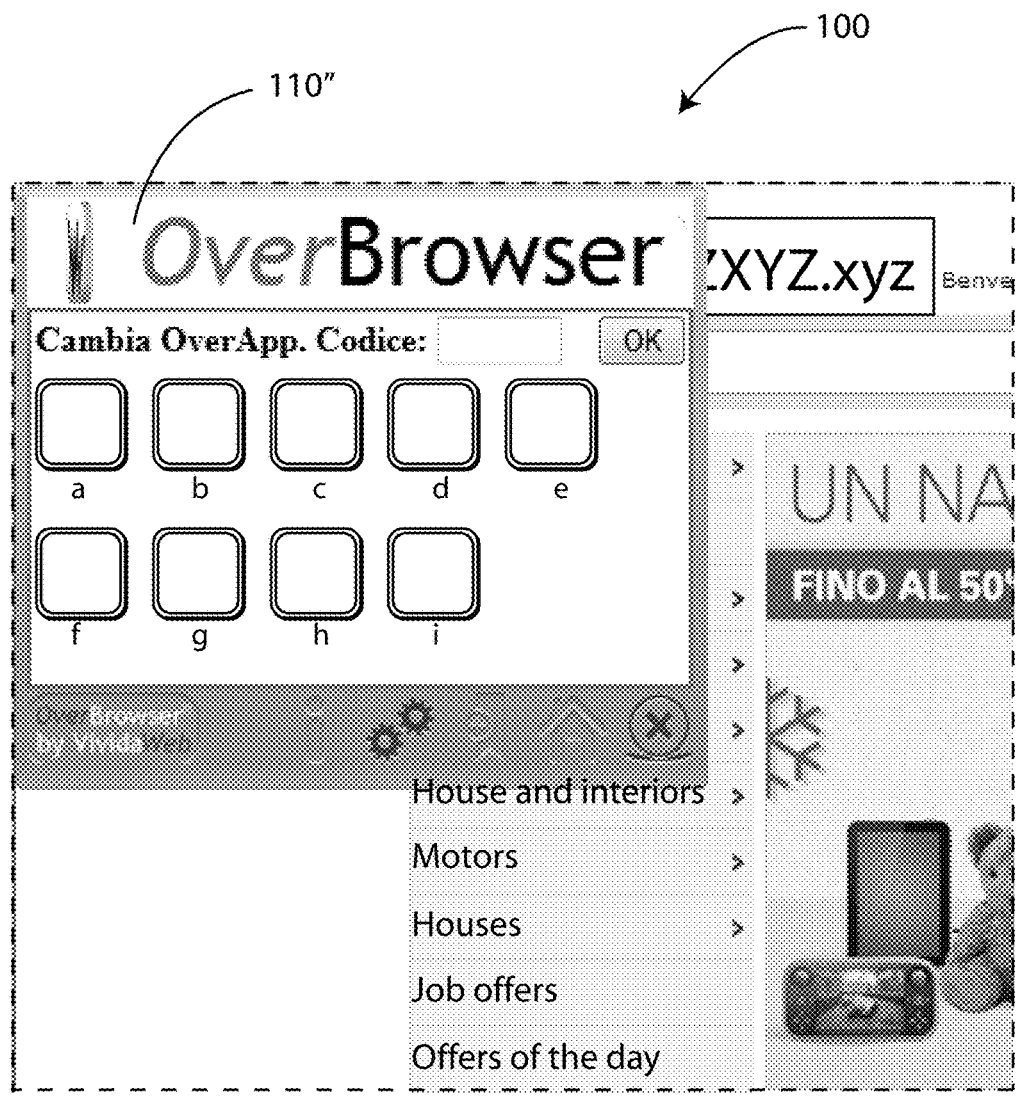
FIG. 4 shows a second example of content obtained by clicking on the icon of FIG. 2.

Examples of the superposition of contents onto a Web page are given in FIGS. 2-4. FIG. 2 shows a Web page 100 with a superposed icon 110 in the left frame. FIG. 3 shows a Web page 100, in which one obtains a banner by clicking on a superposed icon 110'. FIG. 4 shows a Web page 100, in which one obtains a different banner by clicking on a superposed icon 110". The advantages of the solution according to the invention include the following.

The icon, which may be a logo, is superposed over the Web page. It is not invasive and does not hide the contents of the underlying page, because it flows rapidly when scrolling the Web page, it is semi-transparent, and is positioned at the edge of the page. It is movable, in the sense that it is a rotating and twinkling image. The user is attracted to the icon without being disturbed by it.

The menu or window that appears after clicking on the icon is esthetically pleasant and designed following the specification of the customer. It flows rapidly during the vertical or horizontal scrolling of the screen and allows an easy visualization of the underlying contents. It is composed by two "iframes", i.e., panels that are dynamically fed with suitable editors by the customer. It provides configurable information such as, for example, the amount of data traffic saved because of an optional data compression mechanism, find in page, or a bookmark.

The system has a high performance and runs in the "cloud" by using scalable open systems. It can be also installed and managed within the information network of the customers.

The activation of the service in the framework of the mobile networks 2.5G, 3G, 3.5G, and 4G (or LTE), can occur both in the standard mode (set up care of the telephone company and/or auto-configuring SMS) and by applications (iPhone® or Android®). In Wi-Fi, the activation occurs by suitable push mechanisms.

Figure 5:
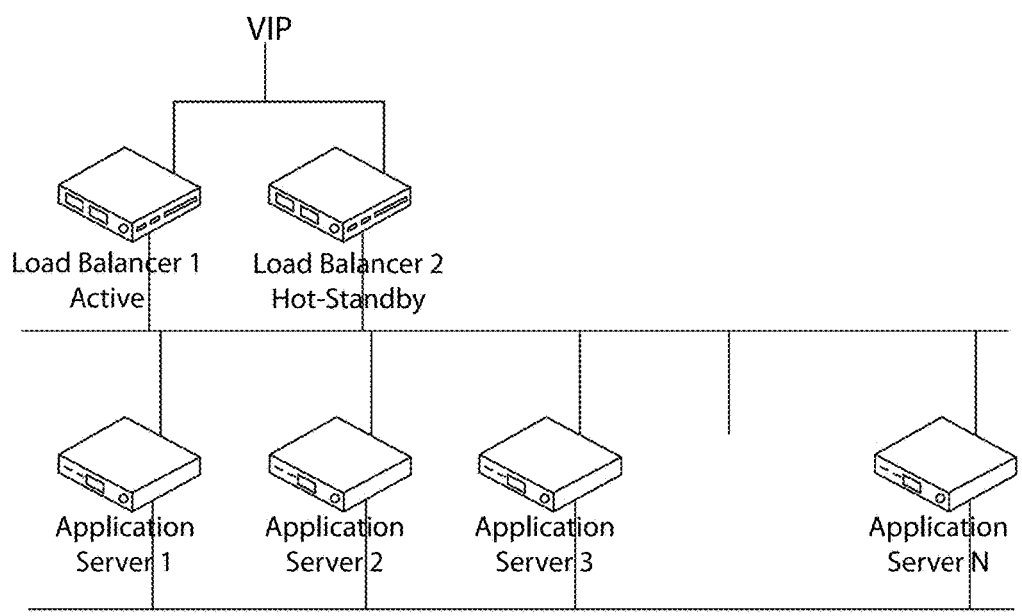
FIG. 5 shows a network architecture that realizes the method according to the invention.

In FIG. 5, a network architecture is shown, which implements the method according to the invention.

To access the superposed content according to the invention, the user will have to configure his own device to pass through the proxy containing the content. The configuration can be made manually on the device or automatically and in a way transparent to the user if the latter accedes from the Wi-Fi network or mobile network operator. The user enters into the browser the Uniform Resource Locator (URL) of the Web page he wants to visit, for example "www.ebay.it." The request arrives via Internet to the VIP (Virtual IP) of the currently active load balancer, which routes the request towards one of the application servers wherein the service according to the invention resides. This requests to the Ebay® servers (at www.ebay.it) and processes the Web page according to the method, and then passes the Web page to the user who receives the requested Web page with the superposed icon according to the invention.

If the user selects the icon, the panel of the multimedia service according to the invention will open.

With respect to the above-mentioned U.S. Patent Application Publication No. 2007/0180147A1, the present invention provides a semi-transparent and superposed content which is superposed "over" the Web page, in an upper "layer" (in the third dimension), without modifying the layout of the original Web page. A three-dimensionality level is added to the Web page and contents placed within an "iframe" (icon or space superposed to the original Web page) are inserted over the page. As explained above, by "over" the z-coordinate is meant, wherefrom the use of the "z-index" comes, which is a CSS property defined in the W3C standard (http://www.w3.org/wiki/CSS/Properties/z-index). The visualized content is superposed over the Web page and retains the same position on the screen of the Web browser and is visible even when the page is "scrolled" downward, upward, rightward, or leftward.

Moreover, the method according to the invention allows any type of content to be inserted in this second layer (being an "iframe") such as images, text, video, etc. This content will be always visible even if the page were "scrolled" downward, upward, rightward, or leftward. The concept can be considered analogous to the Picture In Picture (PIP) of some television sets. Moreover, it can be said that the algorithm of the U.S. Patent Application Publication No. 2007/0180147A1 has been thought in two dimensions, while the present invention is thought in three dimensions.

Most of the method according to the invention is dedicated to finding the right point in the code of the Web page to insert the new code (HTML5, CSS3, and JavaScript). Because a Web page standard does not exist to insert the code, not all Web pages can be modified at the code level in the same manner. A specific command does not exist which is suitable to find these insertion points and therefore, simple code libraries cannot be used. The present method achieves this goal for the situation of changing the coding of the Web pages.

One goal of the method according to the invention has been to keep visualization of the hosting Web page unaltered and not modify the experience of the user in any way. On the contrary, the algorithm described in U.S. Patent Application Publication No. 2007/0180147A1 inserts the code within the "<head>" tag to make the wanted code appear before the original Web page, therefore shifting the original Web page downwards. The present invention method, instead, distinguishes what has to be inserted at the beginning of the "<body>" tag and just before the end of the body section with the "</body>" tag, therefore at the beginning and the end of the body section, to manage all the possible cases of Web pages.

Referring now to the "z-index", it is commonly used in the composition of Web pages and allows a third dimension of placing the elements of a Web page and is part of the W3C standard. It serves to visualize a portion of a Web page over another portion, such as the "send forward/backward" used in many graphical editors.

The simple use of the z-index as such does not guarantee the "superposition" of the additional content over the original Web page. In some cases, the user would see his content passing "below" some object of the hosting page.

To avoid this problem, a particular configuration of the Document Object Model (DOM) variables has been performed. The reason is given in the following.

(1) The "z-index" can have negative and positive values and its maximum value is that of a 32-bit integer, i.e., equal to 2147483647, which is a standard for almost all the browsers on the market. The invention sets the "z-index" of the iframe to the maximum value supported by the Web browsers.

(2) Most part of the Web sites implement pages with objects that rarely exceed a "z-index" value of 100 or 1000, and therefore the invention sets the "z-index" to the maximum possible value to keep the objects over all the other elements constituting the hosting Web page.

(3) There are limiting cases, wherein the hosting Web page has some objects with a "z-index" value that is at its maximum value. In such cases, if the content of the hosting Web page has the same "z-index" level, the latter prevails. However, the method according to the invention "prevents" at the DOM level such a prevalence of the objects of the hosting Web page and, in the case there are elements with the maximum "z-index", places the creation of the elements constituting the "iframe" in such a way to create it as the last one with respect to all the other elements of the hosting Web page. This acts in such a way that the additional object according to the invention comes out to have always a higher priority, even if with the same "z-index", with respect to the elements of the hosting Web page, and therefore is visualized in any case over all the other objects of the hosting Web page.

Inserting the additional elements in such a way that the highest priority with respect to the others means that they must be constructed in the DOM last. This is performed by placing the additional code exactly before the body closing tag ("</body>") so as to be sure that there are no other objects to be constructed by the Web browser.

Finally, the content that is inserted in the iframe can be the content of a captive portal page. When one exits the captive portal, the content follows the iframe which is inserted in the hosting Web page.

In the foregoing, aspects of the invention have been described and variations have been suggested, but it is to be understood that those skilled in the art will be able to change and modify the disclosed invention without so departing from the scope of the enclosed claims.

What is claimed is:

1. A method for the real time automatic modification on the server side of a Web page to visualize content superposed to the Web page on a screen of a computer electronic device by using a browser providing a representation of the web page termed Document Object Model, comprising:
   A. intercepting a Web page requested by the computer electronic device;
   B0. hiding all commented code lines in the code of the Web page, to find a true section "<head>" or "</head>";
   C0. hiding all commented code lines in the code of the Web page, to find a true string "<body>" or "</body>";
   B. searching for
      B1. a first string of "<head>" or "</head>" in the code of the Web page of step A, and
      B2. if the first string is not present, creating a header section in the code of the Web page of step A and executing step B1;
      B3. searching for a second string of "<body>" or "</body>" in the code of the Web page of steps A or B, and
      B4. if the second string is not present, creating a body section starting with the "<body>" string and ending with the "</body>" string in the code of the Web page;
   C. after step B, executing the following steps:
      C1. setting a "z-index" parameter of the superposed content to the maximum value;
      C2. inserting in the Document Object Model a header code relevant to the superposed content;
      C3. inserting in the Document Object Model a body code relevant to the superposed content immediately before the "</body>" string;
   such that:
   if <head> and </head> are lacking, said header is inserted before the <body> tag if it exists, otherwise just after the <html> tag;
   if <head> is lacking but there is </head>, said header is inserted immediately before the </head> tag or just after the <html> tag;
   if <body> is lacking, said header is inserted immediately after the </head> tag;
   if </body> is lacking, said header is inserted immediately before the </html> tag;
   otherwise if it is not possible to find a point for the insertion of <head> or <body> or </body>, the web page is not modified;
   D. sending to the computer electronic device the Web page with the modification of steps B and C;
   wherein if steps B2 or C2 cannot be executed, the Web page of step A is not modified.

2. The method according to claim 1, wherein between steps A and B, the following steps are executed:
   E. obtaining User Agent information of the computer electronic device;
   F. utilizing the User Agent information to distinguish data traffic relevant to a browser and data traffic relevant to an application, discarding the application data, and choosing correct HTML headers.

3. A non-transitory computer-readable storage medium storing a set of instructions for execution by a general purpose computer to automatically modify a Web page in real time on the server side to visualize a content superposed to the Web page on a screen of a computer electronic device by using a browser providing a representation of the web page termed Document Object Model, the set of instructions comprising:
   an intercepting code segment for intercepting a Web page requested by the computer electronic device;
   hiding all commented code lines in the code of the Web page, to find a true section "<head>" or "</head>";
   hiding all commented code lines in the code of the Web page, to find a true string "<body>" or "</body>";
   a first searching code segment for searching for a first string of "<head>" or "</head>" in the code of the intercepted Web page;
   a first creating code segment for creating a header section in the code of the intercepted Web page if the first string is not present;
   a second searching code segment for searching for a second string of "<body>" or "</body>" in the code of the intercepted Web page;
   a second creating code segment for creating a body section starting with the "<body>" string and ending with the "</body>" string in the code of the intercepted Web page if the second string is not present;
   a first inserting code segment for inserting in the Document Object Model a header code relevant to the superposed content after setting a "z-index" parameter of the superposed content to its maximum value;
   a second inserting code segment for inserting in the Document Object Model a body code relevant to the superposed content immediately before the "</body>" string;
   such that:
   if <head> and </head> are lacking, said header is inserted before the <body> tag if it exists, otherwise just after the <html> tag;
   if <head> is lacking but there is </head>, depending on the page structure, said header is inserted immediately before the </head> tag or just after the <html> tag;
   if <body> is lacking, said header is inserted immediately after the </head> tag;
   if </body> is lacking, said header is inserted immediately before the </html> tag;
   otherwise if it is not possible to find a point for the insertion of <head> or <body> or </body>, the web page is not modified;
   a first sending code segment for sending to the computer electronic device the Web page with the modifications of the first inserting code segment and the second inserting code segment; and
   a second sending code segment for sending to the computer electronic device the Web page without modification if the first creating code segment or the second creating code segment cannot be executed.

4. A computer server for automatically modifying a Web page in real time to visualize a content superposed to the Web page on a screen of a computer electronic device by using a browser providing a representation of the web page termed Document Object Model, comprising:
   a receiver configured to intercept a Web page requested by the computer electronic device;
   a processor configured to:
      hiding all commented code lines in the code of the Web page, to find a true section "<head>" or "</head>";
      hiding all commented code lines in the code of the Web page, to find a true string "<body>" or "</body>";

search for a first string of "<head>" or "</head>" in the code of the intercepted Web page;
create a header section in the code of the intercepted Web page if the first string is not present;
search for a second string of "<body>" or "</body>" in the code of the intercepted Web page;
create a body section starting with the "<body>" string and ending with the "</body>" string in the code of the intercepted Web page if the second string is not present;
insert a header code in the Document Object Model relevant to the superposed content after setting a "z-index" parameter of the superposed content to its maximum value; and
insert a body code in the Document Object Model relevant to the superposed content immediately before the "</body>" string;
such that:
if <head> and </head> are lacking, said header is inserted before the <body> tag if it exists, otherwise just after the <html> tag;

if <head> is lacking but there is </head>, said header is inserted immediately before the </head> tag or just after the <html> tag;
if <body> is lacking, said header is inserted immediately after the </head> tag;
if </body> is lacking, said header is inserted immediately before the </html> tag;
otherwise if it is not possible to find a point for the insertion of <head> or <body> or </body>, the web page is not modified; and
a transmitter configured to:
transmit the Web page with the modifications to the computer electronic device if the processor successfully inserts the header code and the body code; and
transmit the Web page without modification to the computer electronic device if the processor cannot create the header section or the body section.

* * * * *